UNITED STATES PATENT OFFICE.

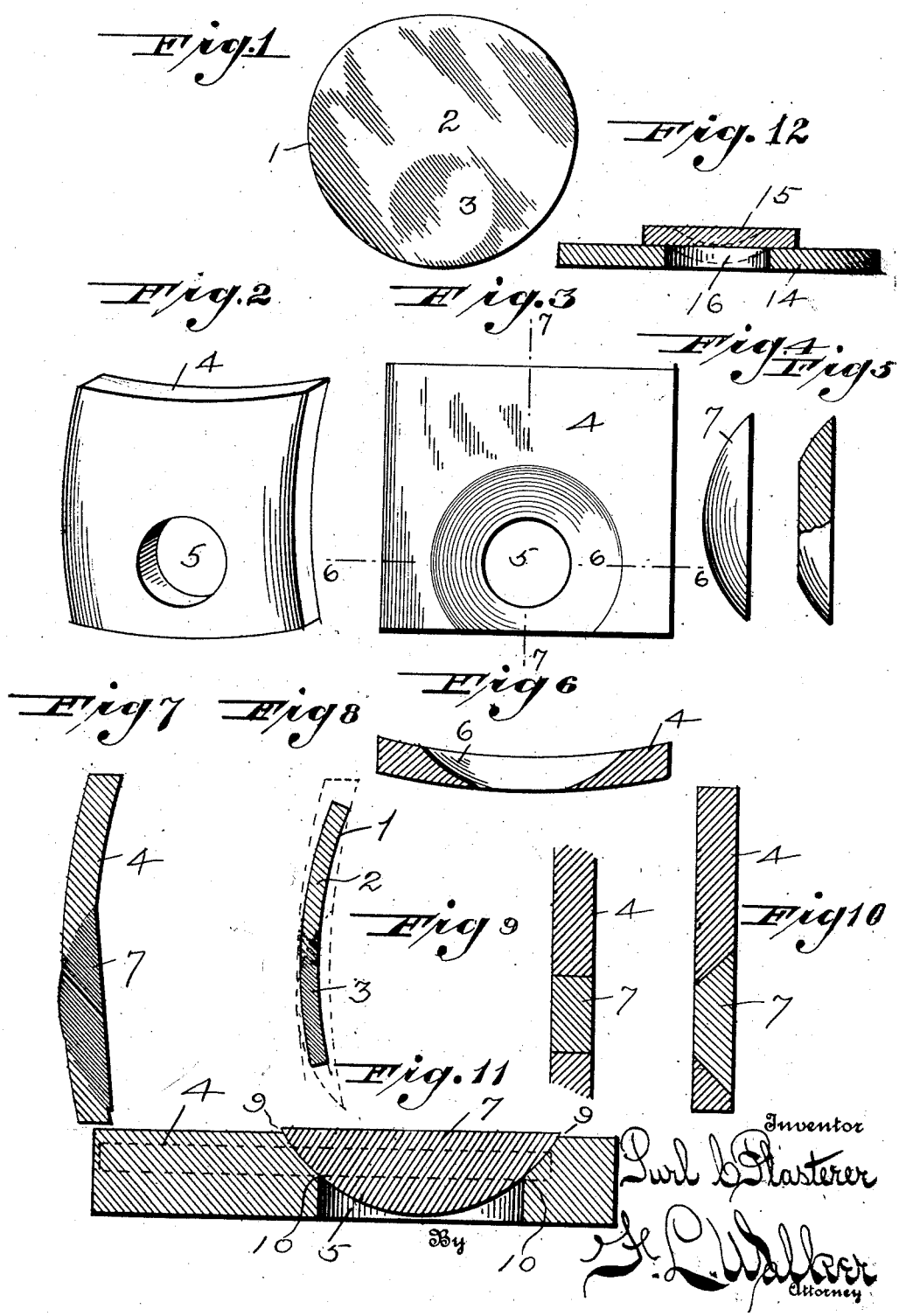

PURL C. PLASTERER, OF DAYTON, OHIO.

METHOD OF MAKING BIFOCAL LENSES.

1,373,633.   Specification of Letters Patent.   Patented Apr. 5, 1921.

Application filed October 29, 1919. Serial No. 334,132.

*To all whom it may concern:*

Be it known that I, PURL C. PLASTERER, a citizen of the United States, residing at Dayton, in the county of Montgomery and State of Ohio, have invented certain new and useful Improvements in Methods of Making Bifocal Lenses, of which the following is a specification.

This invention relates to ophthalmic bifocal lenses, having major and minor elements of different light transmitting properties and the method of making bifocal lens blanks.

The object of the invention is to improve the structure of ophthalmic bifocal lenses whereby they will be more easily and economically manufactured and whereby air bubbles and minute globules of gas or moisture are entirely eliminated from the field of the minor or near vision lens during the process of manufacture and whereby the lens elements are integrally united without disclosing a line of demarcation between such minor and major elements in the finished product.

A further object of the invention is to provide a bifocal lens in which the major or far seeing element may be shaded or colored to serve as a ray filter to eliminate or absorb objectional light rays while the minor element or near vision lens is composed of clear glass.

With the above primary and other incidental objects in view as will more fully appear in the specification, the invention consists of the features of construction, the parts and combinations thereof and the mode of operation or their equivalents as hereinafter described and set forth in the claims.

Referring to the drawings, Figure 1 is a front view of an ophthalmic bifocal lens as hereinafter referred to. Fig. 2 is a perspective view of the crown glass blank in its initial stage of preparation. Fig. 3 is a face view of the crown glass blank after being counter-sunk or recessed to receive the flint glass minor element. Fig. 4 is a side view of the flint glass element to be embedded in the crown glass major element shown in Figs. 2 and 3. Fig. 5 is a detail sectional view of a modification of the minor element. Fig. 6 is a transverse sectional view on line 6—6 of Fig. 3, showing the lenticular concavity or depression in the major crown glass, in which the minor flint glass element is to be embedded. Fig. 7 is a sectional view on line 7—7 of Fig. 3 showing the flint glass minor element embedded in the crown glass major element and fused therewith into a homogeneous body. Fig. 8 is a sectional view somewhat diagrammatic showing the relation of the finished lens to the composite blank illustrated in Fig. 7. Figs. 9 and 10 are detail sectional views of modifications of the composite blank formed by the coalescing or welding of the minor and major elements. Fig. 11 is an enlarged detail sectional view somewhat diagrammatic illustrating the process or method of procedure forming a part of the subject matter hereof. Fig. 12 illustrates a further modification.

Like parts are indicated by similar characters of reference throughout the several views, in which the various degrees of curvature and dimensions of the parts are somewhat exaggerated for the purpose of illustration.

In the manufacture of ophthalmic bifocal lenses the method most generally in use at the present time is to form a composite lens by integrally uniting into a homogeneous body two glass elements possessing different indices of refraction. It is common to employ a high fusing crown glass major element of low refractive index and to embed therein by welding or fusing a low fusing flint glass minor element possessing a high index of refraction, thereafter grinding, shaping, and finishing the combined elements into a composite lens having a radius common to both major and minor elements or a separate radius for each element according to the character of the lenses and the use to which they are to be applied.

In effecting the coalescence or welding of the major and minor elements whether these be of crown and flint glass or glass of other character or description, great difficulty has arisen in preventing the formation of bubbles of air, gas or steam in the field of the minor lens element. This difficulty is probably incident to the hydroscopic character of glass which attracts moisture to its surface from the atmosphere and also the fact that all solid bodies carry on their surfaces a thin closely adherent film of air. These minute quantities of air and moisture transformed into steam by the welding heat, are trapped between the major and minor elements of the lens blank, through the fact that the minor or near vision element is much thinner at its edge than at its center, and therefore, the edge of the near vision element becomes plastic first and settles into adherence with the major or far vision element, preventing the escape of the air or steam which being confined within the composite lens appears as bubbles or blemishes in the body of the lens. This effect is particularly pronounced where the separate pieces of the lens are ground to the same curvature so that they fit closely while being welded or fused into a composite body.

The present invention contemplates overcoming this difficulty by eliminating entirely the trap in which the air bubbles are confined and permitting the free escape of air, gas and steam from the space intermediate the lens elements even after the margin of the small or near vision element has been fused and united with the major element. In the drawings 1 is a finished lens of which 2 is the major or far seeing lens element, which may be of either shaded or clear glass, and 3 is the minor or near vision clear glass element. These lens elements 2 and 3 may be ground and finished to the same curvature or radius, that is to say concentric with a single point or they may be ground and finished to different curvatures or radii according to the conditions of use. The character and relation of the finished surfaces of the elements 2 and 3 form no part of the present invention *per se*.

With a view to eliminating as far as possible the line of demarcation between the lens elements in the finished product, and the eliminating entirely the presence of air, gas, or steam bubbles in the field of the minor or near vision element, the major element blank 4 shown in Fig. 2 is initially prepared by cutting, drilling or otherwise forming a hole 5 entirely through the blank. The major lens blank 4 is preferably crown glass having a high fusing point and a low index of refraction. For convenience of manufacture, the hole 5 is preferably initially formed with straight sides or of cylindrical contour. However, if special tools are provided this hole may be beveled or counter-sunk to more or less extent at the initial operation. After having been pierced as at 5 in Fig. 2, the major lens element is counter-sunk upon either face by the formation therein of a lenticular concavity or depression 6. This lenticular depression may extend substantially through the blank 4 whereby the edge of the opening 5 is comparatively sharp or it may be of less depth affording blunt edges as shown in Fig. 11. This depth of the depression depends somewhat upon the character of the lens which is to be subsequently cut from the blank and the thickness of the major element. The lenticular surface 6 having been finished and polished to the usual high degree, the minor lens blank is ground and finished to a curvature or radius agreeing with that of the lenticular surface 6. The minor lens blank 7 shown in detail in Fig. 4 is preferably though not necessarily from flint glass having a low fusing point and a high index of refraction.

The minor and major lens blanks are then placed in contact as shown in Fig. 11 and are subjected to a fusing heat by which the coalescence or welding of the lens elements is effected. Under the effect of the fusing heat the thinner marginal edges of the minor element 7 will be softened first and caused to adhere to the major element 4. This initial fusing and adherence occurs at the point indicated by 9 in Fig. 11 and the fusing of the lens element 7 and its adherence to the major element 4 is progressive from the point 9 to the point 10. Any air or steam entrained between the lens elements is displaced by the closing of the intervening space toward the point 10 as the fusing and adherence of the lens element progresses. Such air or steam is not trapped but is permitted to freely escape through the enlarged opening 5. The point 10 on account of the increased thickness of the minor element is the last point to fuse and hence the way is kept open for the escape of air or steam globules. This escape of air, steam or gas may be facilitated during the fusing operation by reversing the relation of the major and minor lens element shown in Fig. 11 whereby the minor lens element is positioned beneath the major element with its convex surface uppermost whereby the air, and steam bubbles may escape upward.

The progressive fusing and adherence of the lens elements with provision for the free and complete escape of air, gases or steam effects a perfect union of the lens element between the point 9 and 10 in Fig. 11 whereby the line of demarcation of the lenses is practically if not entirely obliterated. The field of the minor lens element being entirely uncovered during the fusing operation will of course contain no bubbles and affords a clear vision. The lens element having been integrally united into a homogeneous body as shown in Fig. 7, the finished lens may be cut and ground from such blanks to any desired degree of curvature of focal length and may be cut from such position in the blank as to retain more or less of the minor lens element in the finished product as may be desired So long as a perfect juncture between the major and minor element is effected it is not essential that the lenticular surface of the minor element shall be complete. For certain characters of work and particularly for combination with major lens element of certain relative thickness, the curvature of the minor element need not be complete, but the element may be truncated as shown in Fig. 5. In this figure the beveled or inclined marginal surfaces are arcuate to agree with the arcuate contour of the concavity 6, but the opposite faces of the blank are parallel and flat. In Fig. 9 there is shown a further modification in which the minor lens element is of cylindrical form, having the character of a plug so shaped and finished as to accurately fit within the hole 5 of the blank 4. In Fig. 10 there is shown a further modification in which the concavity or recess is of conical form having substantially straight inclined margins and the minor lens blank is of truncated conical form to agree with the recess in the blank 4.

A further but no less important feature of the present invention is the formation of composite or bifocal lenses whereby the major or far vision element is of tinted, colored or shaded glass such as the amber, green, blue, or smoked variety, while the minor or near vision portion is of clear glass. The process heretofore described possesses great adaptability for the production of such combination lenses in view of the fact that the major lens blank is entirely eliminated from the field of the minor lens at the time of manufacture. It may be possible to produce such combination bifocal lens having a clear near vision or minor element and a shaded or tinted major element by other processes of manufacture heretofore used, but the process herein described possesses special advantages which will be at once apparent to the skilled optician.

In the appended claims the reference to shaded or colored glass or lenses is intended to include those materials possessing light filtering or absorbing properties, whether it be some chromatic color or merely a darkened or clouded effect, or glass having light restraining properties which may be otherwise invisible to the eye. While a crown glass having a low index of refraction and a high fusing point and flint glass having a low fusing point and high index of refraction are the preferable materials to be used in the manufacture of ophthalmic bifocal lenses, it is to be understood that this invention is not limited to these materials or the particular combination of materials described, but that glass or material of different characteristics may be employed.

Furthermore, while it is customary in the manufacture of bifocal or composite lenses to provide the lenticular concavity or depression 6, in the major element and form the minor element of convex contour to agree with said cavity the present invention is not limited to such relation of the parts. As a modification of this construction there is shown in Fig. 12 a major element 14, and a minor element 15 of flat or plano formation. The major element is provided with a hole 16 corresponding to hole 5 before mentioned and the minor element is laid over the hole 16 and subjected to a fusing heat. This will effect the adherence or coalescence of the minor element to the major element about the margin of the hole 16, and the softening of the minor element by the fusing heat will cause the minor element to sag into the opening 16 as shown by dotted lines. Of course the depth to which the minor element may be caused to enter into the hole 16 can be regulated by the variation of the heat.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific details shown, but that the means and construction herein disclosed comprise but one of several modes of putting the invention into effect, and the invention is therefore claimed in any of its forms or modifications within the legitimate and valid scope of the appended claims.

Having thus described my invention, I claim:

1. The process of eliminating bubbles from composite blanks of ophthalmic lenses while uniting the elements thereof which consists in providing a vent for the air, gas, or moisture through one of the lens elements.

2. The process of making bifocal lens blanks which consists in forming a concave lenticular surface in one of the elements of the blank, providing a vent leading centrally from said surface through said element, placing a second element in registry with the concave surface and applying heat to the assembled elements until they are welded, the air and gases escaping from between said elements through said vent during the welding operation.

3. The process of uniting together blanks for lenses which consists in superposing them one upon the other, subjecting them to welding temperature whereby one blank is caused to soften and adhere to the other blank, and providing a vent through one of the blanks for the escape of air, gas or steam.

4. The process of making blanks for ophthalmic lenses which consists in forming an opening through the major element, positioning the minor element in registry with said opening and subjecting them to fusing heat whereby the coalescence of the margins of the minor element with the major element is effected.

5. The process of making blanks for ophthalmic lenses which consists in placing the major and minor elements in contact one with the other, providing an air outlet leading from the center of the field of the minor element, and subjecting them to heat whereby the margin of the minor element is caused to initially unite with the major element, the coalescence of said elements under the influence of the fusing temperature being progressive from the margins of the minor element to the outlet at the center of the field.

6. The process of making blanks for ophthalmic lenses which consists in forming the major element of annular form and welding the minor element in the opening of the annulus.

7. The method of making blanks for bifocal lenses consisting in cutting an opening in the major lens element, placing the minor element over said opening and fusing said elements together about the margin of the opening.

8. The method of making blanks for bifocal lenses consisting in forming a lenticular depression in the major lens element, having an opening through said element at the center of said depression, covering said depression with the minor lens element and effecting the coalescence of said elements by subjecting them to fusing heat.

9. The method of making blanks for bifocal lenses which consists in placing two lens elements in contact one with the other, providing an outlet for air from the center of the covered area, subjecting the contacting elements to fusing heat to effect the coalescence of the elements initially at the margins of the covered area, such coalescence being extended progressively inward from the marginal edges to the provided outlet.

In testimony whereof, I have hereunto set my hand this 18th day of October, A. D. 1919.

PURL C. PLASTERER.

Witnesses:
 WILLIAM A. SWANEY,
 GEORGE C. HELMIG.